United States Patent [19]

Tsang

[11] Patent Number: 5,780,993
[45] Date of Patent: Jul. 14, 1998

[54] COMBINATION BATTERY CHARGER AND POWER SOURCE FOR ELECTRICALLY POWERED DEVICES

[76] Inventor: John Moong Hung Tsang, 5947 King Hill Dr., Farmington, N.Y. 14425

[21] Appl. No.: 560,322

[22] Filed: Nov. 17, 1995

[51] Int. Cl.$^6$ ............................................. H01M 10/46
[52] U.S. Cl. .................................... 320/111; 320/112
[58] Field of Search ................................ 320/2, 15, 56, 320/107, 110, 111, 112, 137, 101, 104, 155; D13/103, 107–108; 429/96–100

[56] References Cited

U.S. PATENT DOCUMENTS

| | | | |
|---|---|---|---|
| 4,211,968 | 7/1980 | Sugalski | 320/2 |
| 4,611,160 | 9/1986 | Camens | 320/2 |
| 4,636,703 | 1/1987 | Tohya et al. | 320/2 |
| 5,136,229 | 8/1992 | Galvin | 320/2 |
| 5,160,879 | 11/1992 | Tortola et al. | 320/2 |
| 5,226,540 | 7/1993 | Bradbury | 364/705.01 |
| 5,304,917 | 4/1994 | Somerville | 320/32 |
| 5,333,176 | 7/1994 | Burke et al. | 379/58 |
| 5,418,445 | 5/1995 | Alpert et al. | 320/14 |
| 5,423,083 | 6/1995 | Stellmach | 455/127 |
| 5,522,943 | 6/1996 | Spencer et al. | 320/2 X |
| 5,525,888 | 6/1996 | Toya | 320/2 |

*Primary Examiner*—Edward Tso
*Attorney, Agent, or Firm*—Cumpston & Shaw

[57] ABSTRACT

A combination charger and power source for an electrically powered device having a removable battery pack that has one or more batteries enclosed within a battery pack case having a mechanical connector for removably mechanically attaching the battery pack to the device and an electrical connector for electrically connecting batteries within the case to the device when the battery pack is mechanically attached to the device comprises a case having a mechanical connector adapted to engage the mechanical connector of the battery pack for attaching the battery pack to the charger, an electrical connector adapted to make an electrical connection to the battery pack when the battery pack is attached to the charger, a recess in the case and an integral plug in the recess and pivotally attached to the case for movement between an extended position permitting the charger to be plugged directly into a conventional AC connector, and a recessed position in which the plug is disposed substantially within the recess in the case.

9 Claims, 4 Drawing Sheets

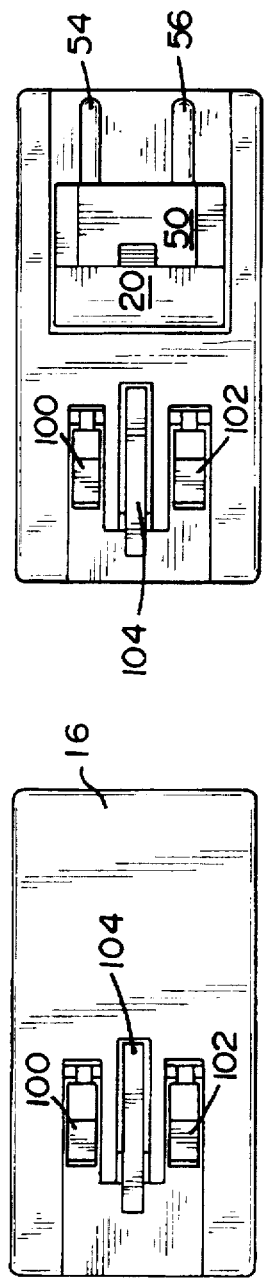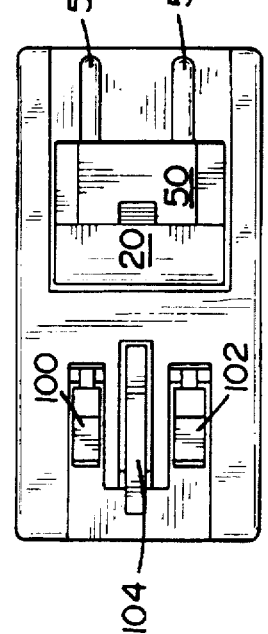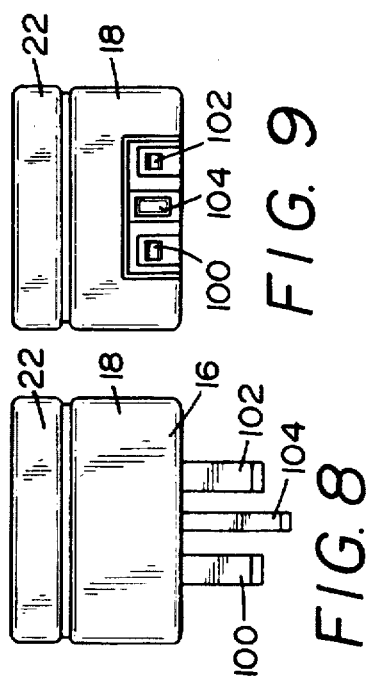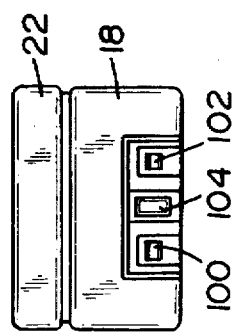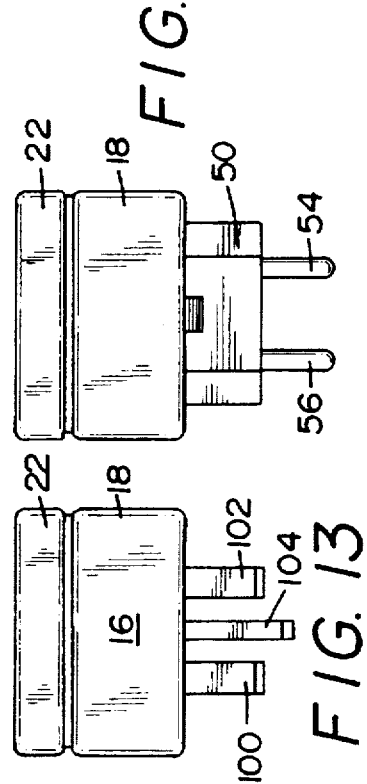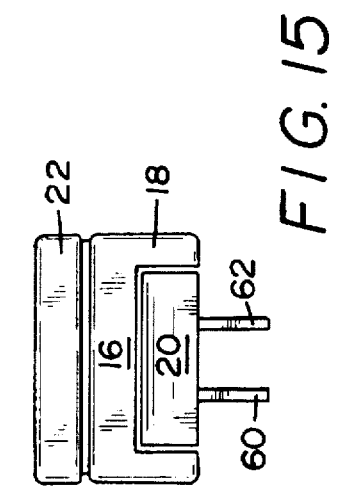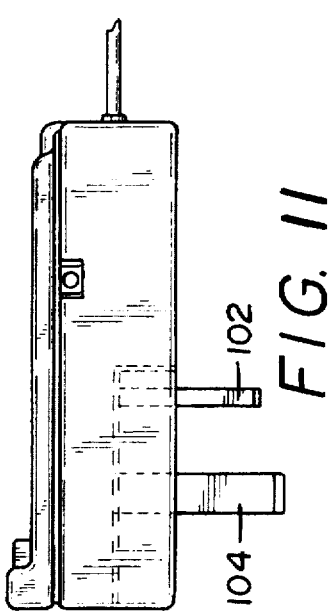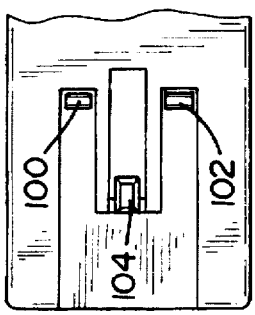

5,780,993

COMBINATION BATTERY CHARGER AND POWER SOURCE FOR ELECTRICALLY POWERED DEVICES

FIELD OF THE INVENTION

This invention relates generally to battery chargers, and more particularly to a one piece wall mountable battery charger and adapter for receiving a battery pack of the type that is adapted to be removably attached to a battery powered item, such as a cellular telephone or video camera or the like.

Battery chargers for removable battery packs for cellular telephones, video cameras and the like are known. However, known chargers are not as convenient as is desirable for a number of reasons. Some such chargers allow the battery pack to be slid into place in a charger in a manner that permits the batteries to be charged while still attached to the device on which it is normally used. Other chargers have an electrical connector with a cord for attaching to the battery pack for charging. Chargers known to applicant all include a conventional flexible power cord with a plug at one end for attaching the charger to a power source, such as a conventional AC connector, either in a wall or at the end of an extension cord.

It is an object of this invention to provide a battery charger and power source for an electrically powered device that is more convenient, has fewer parts and is more flexible in its operation than those known before.

In accordance with a presently preferred embodiment of the invention, a combination charger and power source for an electrically powered device having a removable battery pack that has one or more batteries enclosed within a battery pack case having a mechanical connector for removably mechanically attaching the battery pack to the device and an electrical connector for electrically connecting batteries within the case to the device when the battery pack is mechanically attached to the device comprises a case having a mechanical connector adapted to engage the mechanical connector of the battery pack for attaching the battery pack to the charger, an electrical connector adapted to make an electrical connection to the battery pack when the battery pack is attached to the charger, a recess in the case and an integral plug in the recess and pivotally attached to the case for movement between an extended position permitting the charger to be plugged directly into a conventional AC connector, and a recessed position in which the plug is disposed substantially within the recess in the case.

In accordance with another aspect of the invention, the combination charger and power source includes a connector for supplying power from a battery attached to the charger directly to the device, or supplying power from the source to the device when no battery is attached, or the battery has insufficient charge to operate the device.

In accordance with still another aspect of the invention, the integral plug has flat bladed connectors for attachment to a U.S. style electrical connector, and includes an adapter having a female adapter connected to receive the integral plug and a male connector having round pins adapted to be plugged into a European style electrical outlet, the adapter being sized to be received within the recess of the case of the combination charger and power source while attached to the integral plug, when the plug is in the recessed position.

In accordance with yet another aspect of the invention, the combination charger and power source includes an adapter that can be connected to the connector for permitting a second battery pack to be connected to the charger for charging simultaneously with the first battery pack.

In accordance with a still further aspect of the invention, the combination charger and power source of claim 1 comprises a power converter for converting either AC or DC power connected to the integral plug to power for charging the battery and for powering the device. The combination charger and power source is preferably sized to be portable and even hand held.

BRIEF DESCRIPTION OF THE DRAWINGS

The novel aspects of this invention are set forth with particularity in the appended claims. The invention itself, together with further objects and advantages thereof may be readily comprehended by reference to the following detailed description of a presently preferred embodiment of the invention, taken in conjunction with the accompanying drawing, in which:

FIG. 7 is a bottom plan view of an embodiment of an invention having a UK style plug;

FIG. 8 is a side elevation thereof with the plug extended;

FIG. 9 is a side elevation thereof with the plug retracted;

FIG. 10 is a bottom plan view thereof with the plug retracted;

FIG. 11 is a front view thereof with the plug extended;

FIG. 12 is a bottom plan view of a charger/power source in accordance with this invention having a dual plug assembly, a UK style plug and a US/European style plug;

FIG. 13 is an end elevation thereof with the UK plug extended;

FIG. 14 is an end elevation thereof with the US/European style plug extended;

FIG. 15 is an end elevation thereof with the US style plug extended and the European style adapter removed therefrom;

DETAILED DESCRIPTION OF THE PREFERRED EMBODIMENT

Figure 2:
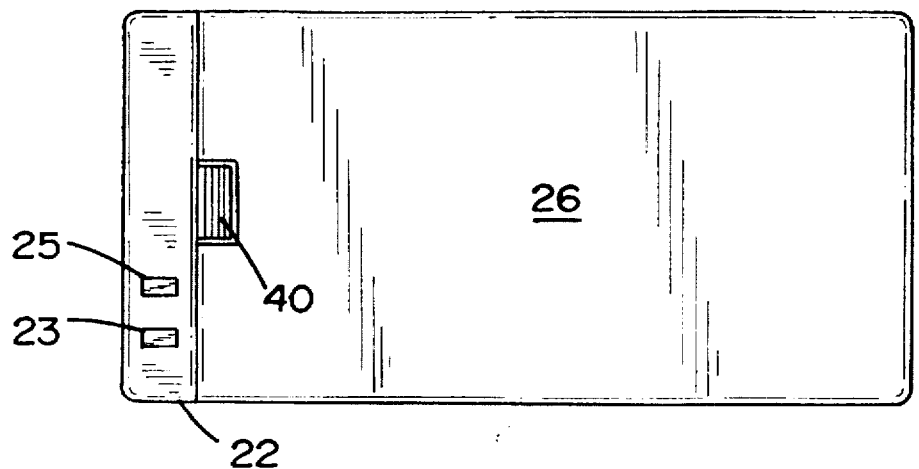
FIG. 2 is a top plan view thereof showing the battery pack in place.
Figure 1:
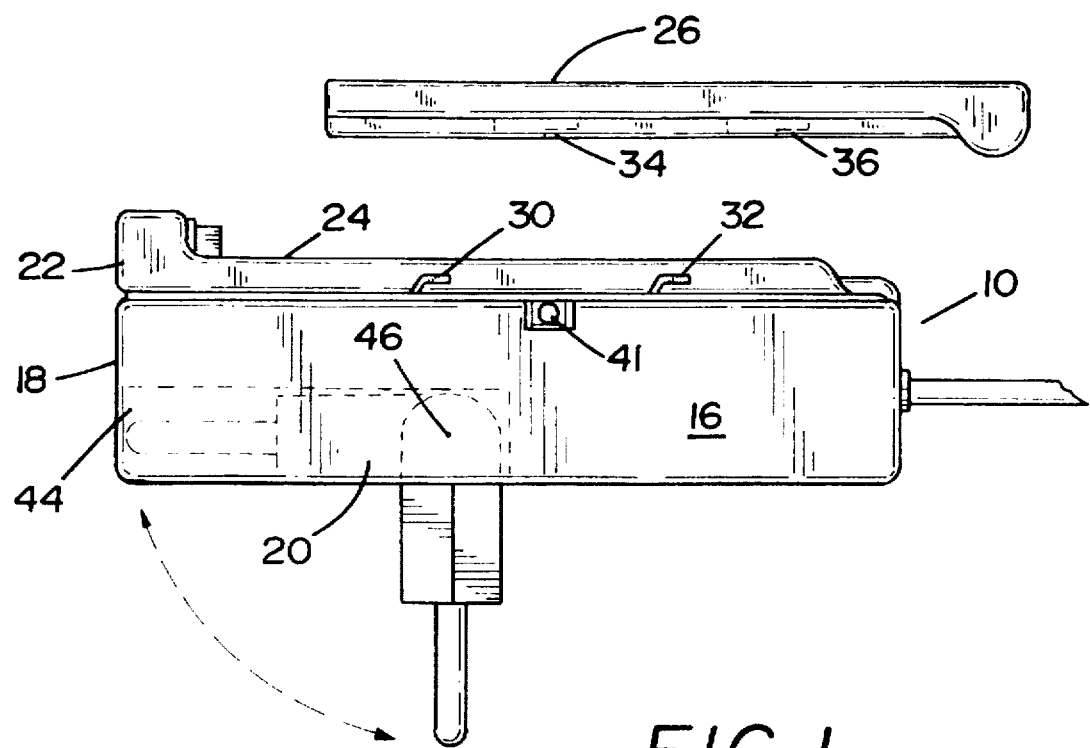
FIG. 1 is a side-elevation of a combination charger and power source in accordance with the invention.

Referring now to FIG. 1, a combination charger and power source 10 for an electrically powered device having a removable battery pack includes a generally rectangular case 16 preferably formed from a durable non-conductive plastic material in two parts, a bottom part 18 carrying a pivotal plug 20 and a top part 22 which is preferably connected to the bottom part 18 by screws or other fasteners such as ultrasonic bonding, chemical adhesives not shown for clarity. Top part 22 includes a recess 24 for receiving a battery pack 26 in mechanical engagement therewith. Preferably, charger 10 includes first and second mechanical connectors 30 and 32 that are adapted to engage corresponding connectors 34 and 36 on the battery pack for holding the battery pack on the charger/power source. These connectors per se form no part of the invention, and different battery packs will require different connectors from those shown and described. Preferably, the battery pack includes a lock 40 seen most clearly in FIG. 2, which holds the battery pack in place on the charger, and also holds the battery pack in place on the device on which it is normally used, such as a cellular telephone. Battery charge status indicators 23, 25 may be provided to give a visual indication of the state of charge of the battery pack, and to indicate that the charger is powered from an external source.

Plug 20 is preferably mounted in a generally rectangular recess 44 formed in the lower section 18 of the charger. Preferably plug 20 is pivotal around an axis 46, which may be a conventional pivot pin, or the combination of a projection extending from the plug and a recess in the case or the analog of this or any similar construction. Plug 20 is shown in FIG. 1 with an optional adapter attached thereto, as will be described in more detail in connection with FIGS. 4 and 5.

Preferably an auxiliary input connector 41 is provided in a sidewall of bottom part 18 of case 16 to allow an external DC power source such as a vehicle battery or a solar powered DC supply to be connected to the combination charger and power source when an AC supply is not available.

Figure 3:
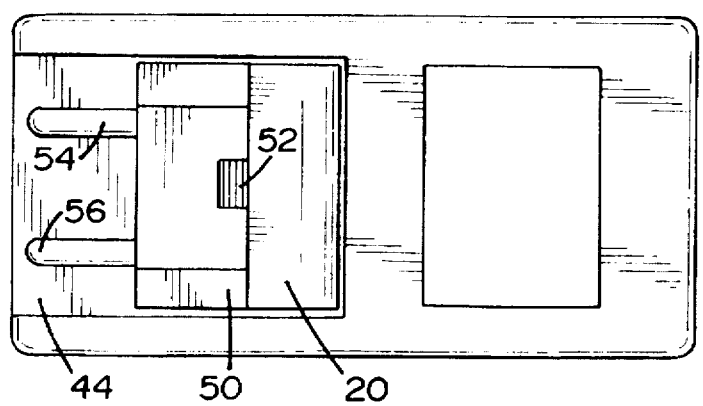
FIG. 3 is a bottom plan view thereof showing the integral plug in its recessed position.
Figure 4:
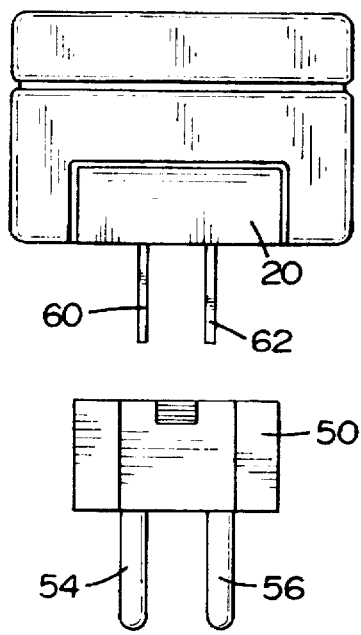
FIG. 4 is a side elevation thereof showing the recessed plug in its extended position and also showing the adapter therefor.

Referring now to FIG. 3, a bottom plan view of the device shows plug 20 and adapter 50 pivoted to a recessed position within recess 44 of bottom portion 18 of case 10. Preferably adapter 50 and plug 20 have cooperating locking elements 52 for fixing adapter 50 in engagement with plug 20. Adapter 50 has first and second generally round electrical contact pins 54 and 56 adapted to engage a standard European style plug. As shown in FIG. 4, plug 20 is provided with first and second generally flat blade style pins 60 and 62 adapted to engage a conventional U.S. style electrical connector. Adapter 50 is preferably provided with two flat blade style receptacles not visible in FIG. 4, for receiving pins 60 and 62.

Figure 5:
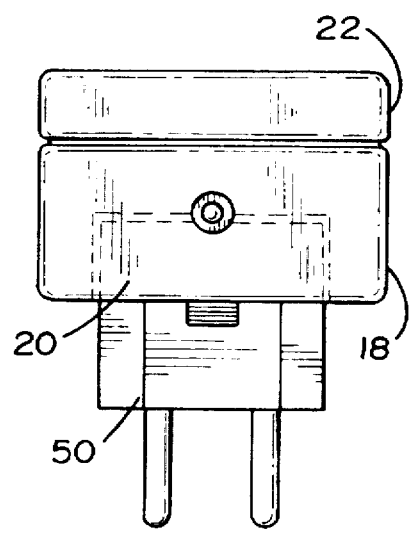
FIG. 5 is a side elevation thereof showing the plug in its extended position with the adapter connected thereto.

FIG. 5 shows adapter 50 installed on plug 20, and pivoted to the extended position for attaching the charger to a European style connector.

Figure 6:
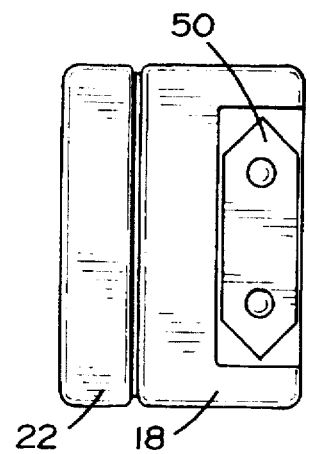
FIG. 6 is an end elevation showing the adapter in place with the plug pivoted to the recessed position.

FIG. 6 shows an end elevation view of adapter 50 attached to plug 20 and pivoted to the recessed configuration within the bottom portion 18 of housing 10.

FIGS. 7-11 show an alternative embodiment of the invention with a single UK connector configuration. FIG. 7 is a bottom plan view of the device showing the three terminals 100, 102 and 104 in a retracted configuration. Terminals 100 and 102 are preferably blade shaped terminals arranged with a cross sectional dimension transverse to the major axis of the case 16. Terminal 104 is preferably a blade shaped connection arranged orthogonally to connectors 100 and 102. FIG. 8 is an end elevation of the configuration of FIG. 7, with the connectors moved to an extended position, and FIG. 9 shows the same view as FIG. 8, but with the connector retracted.

FIG. 10 is a bottom plan view of one end of the adapter with the blade shaped connectors 100, 102 and 104 extended, and FIG. 11 is a side elevation of the entire adapter with the connectors extended.

FIG. 12 is a bottom plan view of an adapter in accordance with this invention that includes each in a separate recess, a UK style connector, and a US style connector with a European style adapter attached to the US style connector. The UK style connectors 100, 102 and 104 are substantially identical to the like numbered connectors shown or described in connection with FIGS. 7-11. The US style connector 20 and European adapter with pins 54 and 56 are substantially identical to those shown and described in connection with FIG. 3.

FIG. 13 is an end elevation of the adapter of FIG. 12, with the UK style connector extended, and the European style connector retracted. FIG. 14 is an end elevation of the adapter of FIG. 12 with the European style adapter affixed to the US style connector, and extended.

FIG. 15 is an end elevation of the adapter of FIG. 12, with the US style connector extended and the European plug adapter removed therefrom. FIG. 15 is taken from the opposite side from FIG. 14. It is also understood the adapter could include a standard Australian style plug format.

Figure 16:
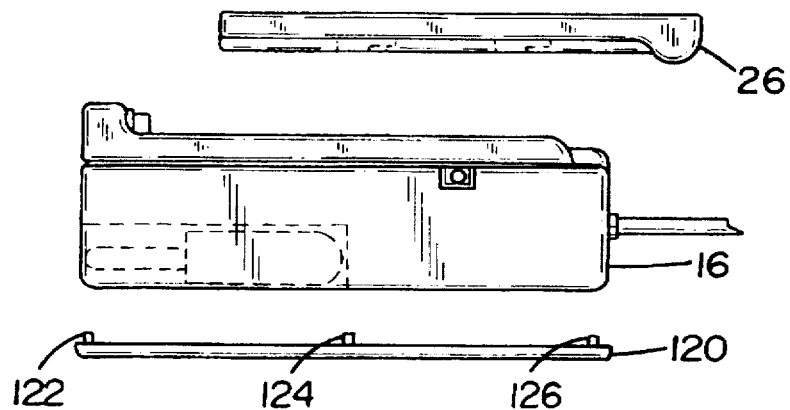
FIG. 16 is a side elevation of an alternative embodiment of the invention having a removable solar powered energy source attached thereto.

FIG. 16 is a side elevation of an embodiment of the invention having a removable solar powered power source. A generally flat array of solar cells is adapted to be mounted to the rear of K16 by way of a plurality of projections 122, 124 and 126 that are adapted to engage cooperatively styled recesses formed in the face of K16. Preferably, at least two of the projections 122 and 126 also provide electrical connections between the solar cell panel and the circuitry inside the case, while the third projection 124 engages a switch not shown within the case for preventing power from the power supply within the case from being applied to the solar cells. Battery pack 26 engages the housing in precisely the same way already described in connection with FIGS. 1 and 2. The solar panel is mechanically connectable to the charger by the projections 122, 124, 126, as well as a friction fit, slide and/or lock mechanism, or other mechanical engagements known in the art. In addition, the charger and solar panel may include electrical contacts to electrically connect the components upon mechanical connection. Alternatively, a jump cable may run from the solar panel to the DC input of the charge.

Figure 17:
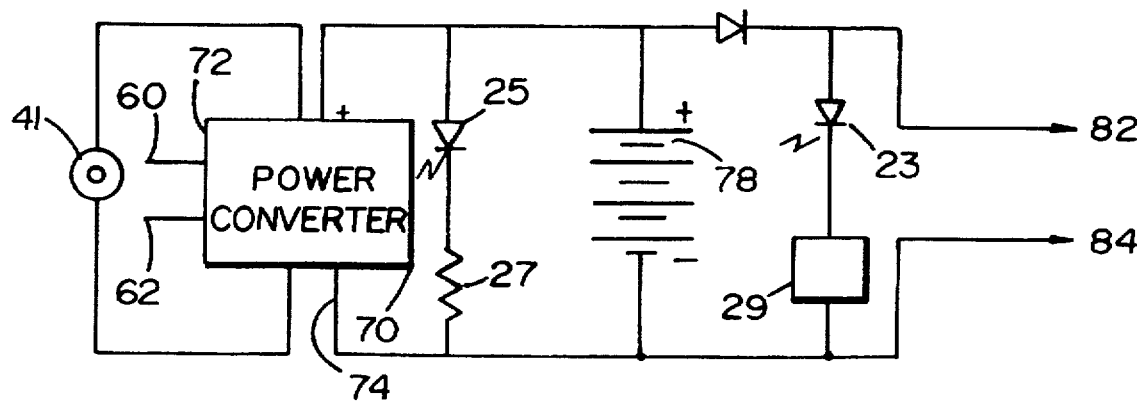
FIG. 17 is a simplified schematic diagram of the charger/power source of the invention.

FIG. 17 is a simplified schematic diagram of the electrical portion of a combination charger/power source in accordance with this invention. A power converter 70 is connected to input pins 60 and 62 for receiving an AC or DC power signal. Alternatively, an external DL power source can be connected to connector 41. A vehicle battery or solar power source can be employed for this purpose. Power converter 70 produces a DC or quasi-DC signal at positive terminal 72 and negative terminal 74, which is connected to the respective positive and negative terminals of a single or multi-cell battery 78 for charging the battery light emitting diode 25, and current limiting resistor 27 provides an indication that power is being applied to the battery. Positive and negative outputs of power converter 70 are also connected through a diode 80 to output terminals 82 and 84 for connection to the battery operated device for providing operating power to the device or to an external battery that can be charged simultaneously with battery 78. Diode 80 permits the external device to be powered by battery 78 if power converter 70 is unplugged or fails. Preferably, a voltage measuring circuit 29 and an indicator lamp 23 are provided to provide an indication that the battery pack is fully charged.

While the invention has been described in connection with a presently preferred embodiment thereof, those skilled in the art will recognize that many modifications and changes may be made therein without departing from the truth and scope of the invention, which accordingly is intended to be defined fully by the appended claims.

What is claimed is:

1. A combination charger and power source for an electrically powered device having a removable battery pack that includes one or more batteries enclosed within a case having a mechanical connector for removably mechanically attaching the battery pack to the device, and an electrical connector for electrically connecting the batteries to the device when the battery pack is mechanically attached to the device, comprising:

- a case having a mechanical connector adapted to engage the mechanical connector of the battery pack to attach the battery pack to the charger;
- an electrical connector adapted to make an electrical connection to the battery pack when the battery pack is attached to the charger;
- a recess in the case;
- an integral plug in the recess and pivotally attached to the case for movement between an extended position permitting the charger to be plugged directly into a conventional AC connector, and a recessed position substantially within the recess; and
- a connector for supplying power from a battery attached to the charger directly to the device, for supplying power from the power source to the device when no battery is attached, or the battery has insufficient charge to operate the device.

2. The combination charger and power source of claim 1 in which the integral plug comprises a plug having flat bladed connectors for attachment to a US style electrical connector, and also comprising an adapter having a female connector adapted to receive the integral plug, and a male connector adapted to be plugged into a European style electrical outlet, the adapter being sized to be received in the recess of the case of the combination charger and power source while attached to the integral plug, when the plug is in the recessed position.

3. The combination charger and power source of claim 1 comprising a power converter for converting either ac or dc power connected to the integral plug to power for charging the battery and for powering the device.

4. The combination charger and power source of claim 1 comprising an array of photo voltaic cells detachably mounted to the case, and an electrical connection on the case for making electrical contact to the array when the array is mounted on the case for allowing the array of photo voltaic cells to charge the battery.

5. The combination charger and power source of claim 1 comprising an electrical connector on the case connected to the battery pack when the battery pack is mounted on the case for allowing the battery pack to be charged from an external direct current power source.

6. The combination charger and power source of claim 1 comprising an indicator light on the case for indicating the state of charge of a battery pack mounted on the case.

7. The combination charger and power source of claim 1 comprising an indicator light on the case for indicating that a battery pack on the case is being charged.

8. The combination charger and power source of claim 1 comprising a second recess and a second integral plug in the recess and pivotally mounted to the case for movement between an extended position permitting the charger to be plugged directly into a conventional AC connector of a different type from the first connector, and a recessed position substantially within the recess.

9. A combination charger and power source for an electrically powered device having a removable battery pack that includes one or more batteries enclosed within a case having a mechanical connector for removably mechanically attaching the battery pack to the device, and an electrical connector for electrically connecting the batteries to the device when the battery pack is mechanically attached to the device, comprising:

- a case having a mechanical connector adapted to engage the mechanical connector of the battery pack to attach the battery pack to the charger;
- an electrical connector adapted to make an electrical connection to the battery pack when the battery pack is attached to the charger;
- a recess in the case; and
- an integral plug in the recess pivotally attached to the case for movement between an extended position permitting the charger to be plugged directly into a conventional AC connector, in a recessed position substantially within the recess, wherein the integral plug comprises a plug having flat bedded connectors for attachment to a US style electrical connector, and also comprising an adapter having a female connector adapted to receive the integral plug, and a male connector adapted to be plugged into a European style electrical outlet, the adapter being sized to be received in the recess of the case of the combination charger and power source while attached to the integral plug when the plug is in the recessed position.

* * * * *